United States Patent
Khlat

(10) Patent No.: US 12,549,138 B1
(45) Date of Patent: *Feb. 10, 2026

(54) BANDWIDTH ADAPTATION IN A TRANSMISSION CIRCUIT

(71) Applicant: Qorvo US, Inc., Greensboro, NC (US)

(72) Inventor: Nadim Khlat, Cugnaux (FR)

(73) Assignee: Qorvo US, Inc., Greensboro, NC (US)

( * ) Notice: Subject to any disclaimer, the term of this patent is extended or adjusted under 35 U.S.C. 154(b) by 267 days.

This patent is subject to a terminal disclaimer.

(21) Appl. No.: 18/171,899

(22) Filed: Feb. 21, 2023

Related U.S. Application Data

(60) Provisional application No. 63/329,997, filed on Apr. 12, 2022.

(51) Int. Cl.
    *H03F 1/42*     (2006.01)
    *H03F 1/02*     (2006.01)
    *H03F 3/24*     (2006.01)

(52) U.S. Cl.
    CPC ............. *H03F 1/42* (2013.01); *H03F 1/0233* (2013.01); *H03F 3/245* (2013.01);
(Continued)

(58) Field of Classification Search
    CPC ............... H03F 2200/451; H03F 3/245; H03F 2200/102; H03F 3/195; H03F 2200/105;
(Continued)

(56) References Cited

U.S. PATENT DOCUMENTS

| | | |
|---|---|---|
| 4,797,898 A | 1/1989 | Martinez |
| 5,793,821 A | 8/1998 | Norrell et al. |
| | (Continued) | |

FOREIGN PATENT DOCUMENTS

| | | |
|---|---|---|
| BR | 112015001348 A2 | 7/2017 |
| CN | 1151229 A | 6/1997 |
| | (Continued) | |

OTHER PUBLICATIONS

Final Office Action for U.S. Appl. No. 17/942,472, mailed Jul. 19, 2023, 16 pages.

(Continued)

*Primary Examiner* — Ajibola A Akinyemi
(74) *Attorney, Agent, or Firm* — Withrow & Terranova, P.L.L.C.

(57) ABSTRACT

Bandwidth adaptation in a transmission circuit is provided. The transmission circuit includes a power amplifier circuit that amplifies a radio frequency (RF) signal based on a modulated voltage, an envelope tracking integrated circuit (ETIC) that generates the modulated voltage based on a modulated target voltage, and a transceiver circuit that generates the RF signal and the modulated target voltage. The RF signal may have a wide modulation bandwidth but the ETIC may have a lower bandwidth limit, which can cause distortion in the modulated voltage and the RF signal. In this regard, the transceiver circuit is configured to generate the modulated target voltage in a lower bandwidth than the bandwidth limit when the modulation bandwidth of the RF signal exceeds the bandwidth limit of the ETIC. As such, the transmission circuit can process the RF signal across the wide modulation bandwidth without causing distortion in the RF signal.

20 Claims, 7 Drawing Sheets

(52) U.S. Cl.
CPC .. *H03F 2200/105* (2013.01); *H03F 2200/165* (2013.01); *H03F 2200/451* (2013.01)

(58) Field of Classification Search
CPC ........ H03F 1/0227; H03F 1/0233; H03F 1/56; H03F 1/0222; H03F 1/3241; H03F 3/21; H03F 1/3258; H03F 2201/3209
USPC .......................................................... 455/73
See application file for complete search history.

(56) References Cited

U.S. PATENT DOCUMENTS

| | | |
|---|---|---|
| 6,166,601 A | 12/2000 | Shalom et al. |
| 6,275,685 B1 | 8/2001 | Wessel et al. |
| 6,630,862 B1 | 10/2003 | Perthold et al. |
| 6,760,451 B1 | 7/2004 | Craven et al. |
| 6,806,767 B2 | 10/2004 | Dow |
| 6,947,711 B1 | 9/2005 | Leyonhjelm |
| 7,076,225 B2 | 7/2006 | Li et al. |
| 7,170,342 B2 | 1/2007 | Suzuki et al. |
| 7,430,248 B2 | 9/2008 | McCallister |
| 7,522,658 B2 | 4/2009 | Jensen |
| 7,583,754 B2 | 9/2009 | Liu |
| 7,663,436 B2 | 2/2010 | Takano et al. |
| 7,683,713 B2 | 3/2010 | Hongo |
| 7,738,593 B2 | 6/2010 | Howard |
| 7,755,429 B2 | 7/2010 | Nguyen et al. |
| 7,831,221 B2 | 11/2010 | Leffel et al. |
| 7,859,338 B2 | 12/2010 | Bajdechi et al. |
| 7,889,820 B2 | 2/2011 | Murthy et al. |
| 7,978,009 B2 | 7/2011 | Mu |
| 8,493,141 B2 | 7/2013 | Khlat et al. |
| 8,605,819 B2 | 12/2013 | Lozhkin |
| 8,649,745 B2 | 2/2014 | Bai et al. |
| 8,749,309 B2 | 6/2014 | Ho et al. |
| 8,831,544 B2 | 9/2014 | Walker et al. |
| 8,884,692 B2 | 11/2014 | Lee |
| 9,001,947 B2 | 4/2015 | Wyville |
| 9,036,734 B1 | 5/2015 | Mauer et al. |
| 9,065,504 B2 | 6/2015 | Kwon et al. |
| 9,112,413 B2 | 8/2015 | Barth et al. |
| 9,356,760 B2 | 5/2016 | Larsson et al. |
| 9,438,196 B2 | 9/2016 | Smith et al. |
| 9,461,596 B1 | 10/2016 | Ozard |
| 9,560,595 B2 | 1/2017 | Dakshinamurthy et al. |
| 9,692,366 B2 | 6/2017 | Pilgram |
| 9,705,477 B2 | 7/2017 | Velazquez |
| 9,973,370 B1 | 5/2018 | Langer et al. |
| 10,177,719 B2 | 1/2019 | Gazneli et al. |
| 10,181,478 B2 | 1/2019 | Scott et al. |
| 10,305,435 B1 | 5/2019 | Murugesu et al. |
| 10,326,408 B2 | 6/2019 | Khlat et al. |
| 10,361,744 B1 | 7/2019 | Khlat |
| 10,432,145 B2 | 10/2019 | Khlat |
| 10,476,437 B2 | 11/2019 | Nag et al. |
| 10,778,345 B2 | 9/2020 | El-Hassan et al. |
| 11,005,368 B2 | 5/2021 | Bansal et al. |
| 11,088,660 B2 | 8/2021 | Lin et al. |
| 11,387,789 B2 | 7/2022 | Khlat et al. |
| 11,424,719 B2 | 8/2022 | Khlat |
| 11,483,186 B2 | 10/2022 | Casper et al. |
| 11,569,783 B2 | 1/2023 | Nomiyama et al. |
| 11,637,531 B1 | 4/2023 | Perreault et al. |
| 2001/0022532 A1 | 9/2001 | Dolman |
| 2001/0054974 A1 | 12/2001 | Wright |
| 2002/0190811 A1 | 12/2002 | Sperber |
| 2003/0042979 A1 | 3/2003 | Gurvich et al. |
| 2004/0239446 A1 | 12/2004 | Gurvich et al. |
| 2004/0259509 A1 | 12/2004 | Duello et al. |
| 2005/0100105 A1 | 5/2005 | Jensen |
| 2005/0254659 A1 | 11/2005 | Heinsen |
| 2005/0258898 A1 | 11/2005 | Hongo |
| 2006/0068710 A1 | 3/2006 | Jensen |
| 2006/0209981 A1 | 9/2006 | Kluesing et al. |
| 2006/0217083 A1 | 9/2006 | Braithwaite |
| 2007/0032208 A1 | 2/2007 | Choi et al. |
| 2008/0009258 A1 | 1/2008 | Safarian et al. |
| 2008/0074209 A1 | 3/2008 | Ceylan et al. |
| 2008/0161073 A1 | 7/2008 | Park et al. |
| 2008/0246550 A1 | 10/2008 | Biedka et al. |
| 2009/0004981 A1 | 1/2009 | Eliezer et al. |
| 2009/0061787 A1 | 3/2009 | Koller et al. |
| 2009/0074106 A1 | 3/2009 | See et al. |
| 2009/0125264 A1 | 5/2009 | Betts et al. |
| 2009/0141828 A1 | 6/2009 | Huang et al. |
| 2009/0141830 A1 | 6/2009 | Ye |
| 2009/0232260 A1 | 9/2009 | Hayashi et al. |
| 2009/0302945 A1 | 12/2009 | Catoiu et al. |
| 2010/0135439 A1 | 6/2010 | Lackey |
| 2010/0298030 A1 | 11/2010 | Howard |
| 2011/0095826 A1 | 4/2011 | Hadjichristos et al. |
| 2011/0182347 A1 | 7/2011 | Cheung |
| 2011/0227767 A1 | 9/2011 | O'Brien |
| 2012/0068748 A1 | 3/2012 | Stojanovic et al. |
| 2012/0139635 A1 | 6/2012 | Ho et al. |
| 2012/0189081 A1 | 7/2012 | Omoto et al. |
| 2012/0244824 A1 | 9/2012 | Entezari et al. |
| 2012/0256688 A1 | 10/2012 | Onishi |
| 2013/0141062 A1 | 6/2013 | Khlat |
| 2013/0214858 A1 | 8/2013 | Tournatory et al. |
| 2013/0222057 A1 | 8/2013 | Henshaw |
| 2013/0243129 A1 | 9/2013 | Okuni et al. |
| 2014/0028368 A1 | 1/2014 | Khlat |
| 2014/0029683 A1 | 1/2014 | Morris et al. |
| 2014/0055199 A1 | 2/2014 | Takano et al. |
| 2014/0062590 A1 | 3/2014 | Khlat et al. |
| 2014/0062599 A1 | 3/2014 | Xu et al. |
| 2014/0065989 A1 | 3/2014 | McLaurin |
| 2014/0072307 A1 | 3/2014 | Zamani et al. |
| 2014/0084996 A1 | 3/2014 | Schwent et al. |
| 2014/0105264 A1 | 4/2014 | McLaurin et al. |
| 2014/0184337 A1 | 7/2014 | Nobbe et al. |
| 2014/0213196 A1 | 7/2014 | Langer et al. |
| 2014/0232470 A1 | 8/2014 | Wilson |
| 2014/0266432 A1 | 9/2014 | Scott et al. |
| 2014/0315504 A1 | 10/2014 | Sakai et al. |
| 2014/0361837 A1 | 12/2014 | Strange et al. |
| 2015/0028946 A1 | 1/2015 | Al-Qaq et al. |
| 2015/0126142 A1 | 5/2015 | Meredith |
| 2015/0333781 A1 | 11/2015 | Alon et al. |
| 2016/0173030 A1 | 6/2016 | Langer et al. |
| 2016/0174293 A1 | 6/2016 | Mow et al. |
| 2016/0182099 A1 | 6/2016 | Boddupally et al. |
| 2016/0182100 A1 | 6/2016 | Menkhoff et al. |
| 2016/0269210 A1 | 9/2016 | Kim et al. |
| 2016/0301432 A1 | 10/2016 | Shizawa et al. |
| 2016/0322992 A1 | 11/2016 | Okawa et al. |
| 2017/0005676 A1 | 1/2017 | Yan et al. |
| 2017/0104502 A1 | 4/2017 | Pratt |
| 2017/0149457 A1 | 5/2017 | Mayer et al. |
| 2017/0170838 A1 | 6/2017 | Pagnanelli |
| 2017/0230924 A1* | 8/2017 | Wolberg ................. H03F 3/195 |
| 2017/0338842 A1 | 11/2017 | Pratt |
| 2017/0353197 A1 | 12/2017 | Ruffieux et al. |
| 2018/0034418 A1 | 2/2018 | Blednov |
| 2018/0175813 A1 | 6/2018 | Scott et al. |
| 2018/0226923 A1 | 8/2018 | Nagamori |
| 2018/0248570 A1 | 8/2018 | Camuffo |
| 2019/0041890 A1 | 2/2019 | Chen et al. |
| 2019/0058530 A1 | 2/2019 | Rainish et al. |
| 2019/0068234 A1 | 2/2019 | Khlat et al. |
| 2019/0097671 A1* | 3/2019 | Dimpflmaier ............ H03F 3/19 |
| 2019/0238152 A1 | 8/2019 | Pagnanelli |
| 2019/0245496 A1 | 8/2019 | Khlat et al. |
| 2019/0296929 A1 | 9/2019 | Milicevic et al. |
| 2019/0319583 A1 | 10/2019 | El-Hassan et al. |
| 2019/0356285 A1 | 11/2019 | Khlat et al. |
| 2020/0106392 A1 | 4/2020 | Khlat et al. |
| 2020/0119699 A1 | 4/2020 | Nishihara et al. |
| 2020/0136561 A1* | 4/2020 | Khlat ..................... H03F 3/195 |
| 2020/0136563 A1 | 4/2020 | Khlat |
| 2020/0136568 A1 | 4/2020 | Hosoda et al. |
| 2020/0162030 A1 | 5/2020 | Drogi et al. |
| 2020/0204422 A1 | 6/2020 | Khlat |

(56) References Cited

U.S. PATENT DOCUMENTS

| | | |
|---|---|---|
| 2020/0259685 A1 | 8/2020 | Khlat |
| 2020/0295713 A1 | 9/2020 | Khlat |
| 2020/0336111 A1 | 10/2020 | Khlat |
| 2021/0058970 A1 | 2/2021 | Kwak et al. |
| 2021/0067097 A1 | 3/2021 | Wang et al. |
| 2021/0099136 A1 | 4/2021 | Drogi et al. |
| 2021/0143859 A1 | 5/2021 | Hageraats et al. |
| 2021/0194517 A1 | 6/2021 | Mirea et al. |
| 2021/0194740 A1 | 6/2021 | Aldana et al. |
| 2021/0281228 A1 | 9/2021 | Khlat |
| 2021/0399690 A1 | 12/2021 | Panseri et al. |
| 2022/0021348 A1 | 1/2022 | Philpott et al. |
| 2022/0216834 A1 | 7/2022 | Myoung et al. |
| 2022/0360229 A1 | 11/2022 | Khlat |
| 2022/0407462 A1 | 12/2022 | Khlat |
| 2022/0407463 A1 | 12/2022 | Khlat et al. |
| 2022/0407464 A1 | 12/2022 | Khlat et al. |
| 2022/0407465 A1 | 12/2022 | Khlat |
| 2022/0407478 A1 | 12/2022 | Khlat et al. |
| 2022/0416730 A1 | 12/2022 | Su et al. |
| 2023/0065760 A1 | 3/2023 | Hellberg |
| 2023/0079153 A1 | 3/2023 | Khlat |
| 2023/0080621 A1 | 3/2023 | Khlat |
| 2023/0080652 A1 | 3/2023 | Khlat et al. |
| 2023/0081095 A1 | 3/2023 | Khlat |
| 2023/0082145 A1 | 3/2023 | Lin et al. |
| 2023/0140184 A1 | 5/2023 | Zhu et al. |
| 2023/0155614 A1 | 5/2023 | Jelonnek et al. |
| 2023/0238927 A1 | 7/2023 | Kay et al. |
| 2023/0318537 A1 | 10/2023 | Scott et al. |
| 2023/0387859 A1 | 11/2023 | Drogi et al. |
| 2023/0387861 A1 | 11/2023 | Maxim et al. |
| 2023/0421111 A1 | 12/2023 | Khlat et al. |
| 2024/0372665 A1 | 11/2024 | Khoryaev et al. |
| 2024/0426954 A1 | 12/2024 | Guan et al. |

FOREIGN PATENT DOCUMENTS

| | | |
|---|---|---|
| CN | 1326321 C | 12/2001 |
| CN | 1550064 A | 11/2004 |
| CN | 1706096 A | 12/2005 |
| CN | 101036289 A | 9/2007 |
| CN | 101651459 A | 2/2010 |
| CN | 105812073 A | 7/2016 |
| CN | 107483021 A | 12/2017 |
| CN | 110798155 A | 2/2020 |
| CN | 110855251 A | 2/2020 |
| CN | 111064438 A | 4/2020 |
| CN | 210693998 U | 6/2020 |
| CN | 112995079 A | 6/2021 |
| CN | 113055324 A | 6/2021 |
| CN | 113659938 A | 11/2021 |
| CN | 113055324 B | 12/2021 |
| CN | 116015223 A | 4/2023 |
| CN | 113659938 B | 5/2023 |
| CN | 116794580 A | 9/2023 |
| CN | 117134711 A | 11/2023 |
| CN | 118117977 A | 5/2024 |
| CN | 118648236 A | 9/2024 |
| CN | 118872201 A | 10/2024 |
| CN | 118117977 B | 11/2024 |
| CN | 119072847 A | 12/2024 |
| CN | 119096468 A | 12/2024 |
| EP | 2705604 A2 | 3/2014 |
| EP | 2582041 B1 | 4/2018 |
| EP | 2232713 B1 | 10/2018 |
| EP | 3416340 A1 | 12/2018 |
| JP | 2011211533 A | 10/2011 |
| JP | 2015099972 A | 5/2015 |
| KR | 20110105319 A | 9/2011 |
| WO | 2007092794 A2 | 8/2007 |
| WO | 2010011551 A2 | 1/2010 |
| WO | 2010135711 A1 | 11/2010 |
| WO | 2012151594 A2 | 11/2012 |
| WO | 2014026178 A1 | 2/2014 |
| WO | 2021042088 A2 | 3/2021 |
| WO | 2023147211 A1 | 8/2023 |
| WO | 2023150539 A1 | 8/2023 |
| WO | 2023150545 A1 | 8/2023 |
| WO | 2023150587 A1 | 8/2023 |

OTHER PUBLICATIONS

Williams, P., "Crossover Filter Shape Comparisons," White Paper, Linea Research, Jul. 2013, 13 pages.

Corrected Notice of Allowability for U.S. Appl. No. 17/942,472, mailed Nov. 17, 2023, 6 pages.

Non-Final Office Action for U.S. Appl. No. 17/939,350, mailed Jan. 17, 2024, 11 pages.

Cho, M., "Analog Predistortion for Improvement of RF Power Amplifier Efficiency and Linearity," A Dissertation presented to the Academic Faculty in partial fulfillment of the requirements for the degree Doctor of Philosophy in the School of Electrical and Computer Engineering, Georgia Institute of Technology, Aug. 2016, available from the Internet: [URL: https://repository.gatech.edu/server/api/core/bitstreams/b8fe5cbb-e5db-4efe-b9a2-eaad5f671f14/content], 113 pages.

Kwak, T.-W. et al., "A 2W Cmos Hybrid Switching Amplitude Modulator for EDGE Polar Transmitters," IEEE Journal of Solid-State Circuits, vol. 42, No. 12, Dec. 2007, IEEE, pp. 2666-2676.

Paek, J.-S. et al., "A -137 dBm/Hz Noise, 82% Efficiency AC-Coupled Hybrid Supply Modulator With Integrated Buck-Boost Converter," IEEE Journal of Solid-State Circuits, vol. 51, No. 11, Nov. 2016, IEEE pp. 2757-2768.

Non-Final Office Action for U.S. Appl. No. 17/737,300, mailed Aug. 28, 2023, 14 pages.

Extended European Search Report for European Patent Application No. 23153108.8, mailed Jun. 20, 2023, 18 pages.

Advisory Action for U.S. Appl. No. 17/942,472, mailed Sep. 15, 2023, 3 pages.

Notice of Allowance for U.S. Appl. No. 17/942,472, mailed Oct. 18, 2023, 10 pages.

International Search Report and Written Opinion for International Patent Application No. PCT/US2023/019267, mailed Aug. 3, 2023, 14 pages.

Advisory Action U.S. Appl. No. 17/689,232, mailed May 23, 2024, 3 pages.

Non-Final Office Action for U.S. Appl. No. 17/689,232, mailed Jul. 17, 2024, 22 pages.

Final Office Action for U.S. Appl. No. 17/939,350, mailed May 21, 2024, 11 pages.

Non-Final Office Action for U.S. Appl. No. 17/700,826, mailed May 15, 2024, 28 pages.

International Search Report and Written Opinion for International Patent Application No. PCT/US2023/061734, mailed May 30, 2023, 15 pages.

International Search Report and Written Opinion for International Patent Application No. PCT/US2023/061741, mailed Jun. 1, 2023, 14 pages.

Invitation to Pay Additional Fees and Partial International Search for International Patent Application No. PCT/US2023/061804, mailed May 26, 2023, 10 pages.

International Search Report and Written Opinion for International Patent Application No. PCT/US2023/061804, mailed Jul. 17, 2023, 20 pages.

Paek, J.-S. et al., "Design of Boosted Supply Modulator With Reverse Current Protection for Wide Battery Range in Envelope Tracking Operation," IEEE Transactions on Microwave Theory and Techniques, vol. 67, No. 1, Jan. 2019, pp. 183-194.

Non-Final Office Action for U.S. Appl. No. 17/700,685, mailed Dec. 22, 2023, 24 pages.

Non-Final Office Action for U.S. Appl. No. 17/689,232, mailed Dec. 11, 2023, 27 pages.

Notice of Allowance and Examiner-Initiated Interview Summary for U.S. Appl. No. 17/737,300, mailed Dec. 19, 2023, 12 pages.

Notice of Allowance for U.S. Appl. No. 17/700,700, mailed Oct. 23, 2023, 9 pages.

(56) References Cited

OTHER PUBLICATIONS

Supplemental Notice of Allowability for U.S. Appl. No. 17/700,700, mailed Nov. 8, 2023, 5 pages.
Extended European Search Report for European Patent Application No. 23174010.1, mailed Oct. 10, 2023, 10 pages.
Corrected Notice of Allowability for U.S. Appl. No. 17/737,300, mailed Dec. 27, 2023, 8 pages.
Notice of Allowance for U.S. Appl. No. 17/700,685, mailed Apr. 5, 2024, 7 pages.
Final Office Action for U.S. Appl. No. 17/689,232, mailed Mar. 26, 2024, 28 pages.
Supplemental Notice of Allowability for U.S. Appl. No. 17/700,700, mailed Feb. 28, 2024, 5 pages.
International Search Report and Written Opinion for International Patent Application No. PCT/US2022/043600, mailed Jan. 11, 2023, 15 pages.
Non-Final Office Action for U.S. Appl. No. 17/942,472, mailed Feb. 16, 2023, 13 pages.
Extended European Search Report for European Patent Application No. 22195382.1, mailed Feb. 1, 2023, 26 pages.
Extended European Search Report for European Patent Application No. 22195683.2, mailed Feb. 10, 2023, 12 pages.
Non-Final Office Action for U.S. Appl. No. 17/700,700, mailed Apr. 13, 2023, 11 pages.
Bai, W.-D. et al., "Principle of Vector Synthesis Predistortion Linearizers Controlling AM/AM and AM/PM Independently," 2016 IEEE International Conference on Ubiquitous Wireless Broadband (ICUWB), Oct. 16-19, 2016, Nanjing, China, IEEE, 3 pages.
Extended European Search Report for European Patent Application No. 22195695.6, mailed Feb. 14, 2023, 12 pages.
Extended European Search Report for European Patent Application No. 22196188.1, mailed Feb. 2, 2023, 25 bages.
Hammi et al., "Temperature Compensated Digital Predistorter for 3G Power Amplifiers," Electronics, Circuit and Systems, 2005, Dec. 11, 2005, pp. 1-4.
Hao et al., "Hybrid Analog/Digital Linearization Based on Dual-Domain Decomposition of Nonlinearity," 2019 IEEE Asia-Pacific Microwave Conference, Dec. 10, 2019, pp. 156-158.
Lee et al., "Fully Automated Adaptive Analog Predistortion Power Amplifier in WCDMA Applications," 2005 European Microwave Conference CNIT La Defense, Paris, France, vol. 2, Oct. 4, 2005, pp. 967-970.
Li et al., "Analog Predistorter Averaged Digital Predistortion for Power Amplifiers in Hybrid Beam-Forming Multi-Input Multi-Output Transmitter," IEEE Access, vol. 8, Aug. 1, 2020, pp. 146145-146153.
Tome et al., "Hybrid Analog/Digital Linearizatio nof GaN HEMT-Based Power Amplifiers," IEEE Transactions on Microwave Theory and Techniques, vol. 67, No. 1, Jan. 1, 2019, pp. 288-294.
Notice of Allowance for U.S. Appl. No. 17/689,232, mailed Oct. 21, 2024, 10 pages.
Notice of Allowance for U.S. Appl. No. 17/714,244, mailed Sep. 16, 2024, 8 pages.
Non-Final Office Action for U.S. Appl. No. 17/939,350, mailed Sep. 6, 2024, 8 pages.
Non-Final Office Action for U.S. Appl. No. 17/890,538, mailed Oct. 21, 2024, 13 pages.
Notice of Allowance and Examiner-Initiated Interview Summary for U.S. Appl. No. 17/700,826, mailed Sep. 11, 2024, 10 pages.
International Search Report and Written Opinion for International Patent Application No. PCT/US2023/060803, mailed May 19, 2023, 13 pages.
International Search Report and Written Opinion for International Patent Application No. PCT/US2023/060804, mailed May 4, 2023, 19 pages.
International Search Report and Written Opinion for International Patent Application No. PCT/US2023/025512, mailed Sep. 28, 2023, 13 pages.
International Search Report and Written Opinion for International Patent Application No. PCT/US2023/060303, mailed Apr. 11, 2023, 12 pages.
Fu, J.-S. et al., "Improving Power Amplifier Efficiency and Linearity Using a Dynamically Controlled Tunable Matching Network," IEEE Transactions on Microwave Theory and Techniques, vol. 56, No. 12, Dec. 2008, pp. 3239-3244.
Kim, S. et al., "A Tunable Power Amplifier Employing Digitally Controlled Accumulation-mode Varactor Array for 2.4-GHz Short-range Wireless Communication," 2016 IEEE Asia Pacific Conference on Circuits and Systems (APCCAS), Oct. 25-28, 2016, Jeju, Korea (South), IEEE, pp. 269-272.
Wang, T.-P., "A Fully Integrated W-Band Push-Push CMOS VCO With Low Phase Noise and Wide Tuning Range," IEEE Transactions on Ultrasonics, Ferroelectrics, and Frequency Control, vol. 58, No. 7, Jul. 2011, IEEE, pp. 1307-1319.
Wanner, R. et al., "Monolithically Integrated SiGe Push-Push Oscillators in the Frequency Range 50-190 GHZ," 2006 IEEE Ninth International Symposium on Spread Spectrum Techniques and Applications, Aug. 28-31, 2006, Manaus, Brazil, IEEE, pp. 26-30.

* cited by examiner

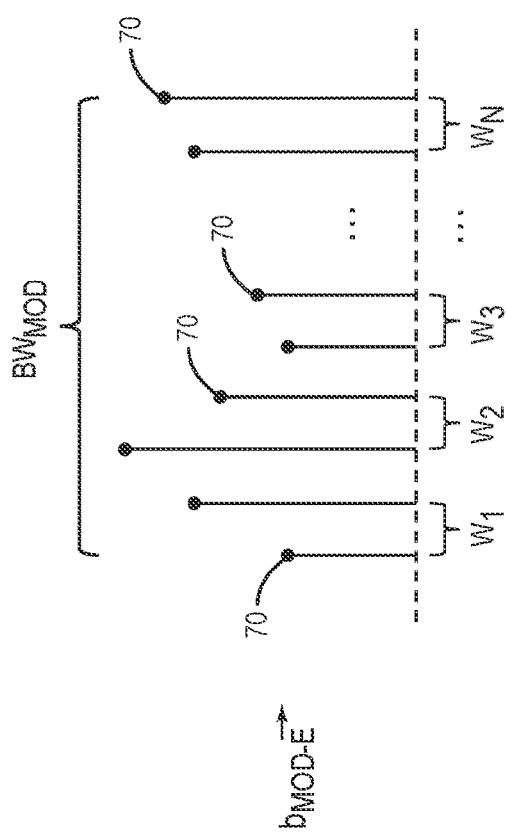
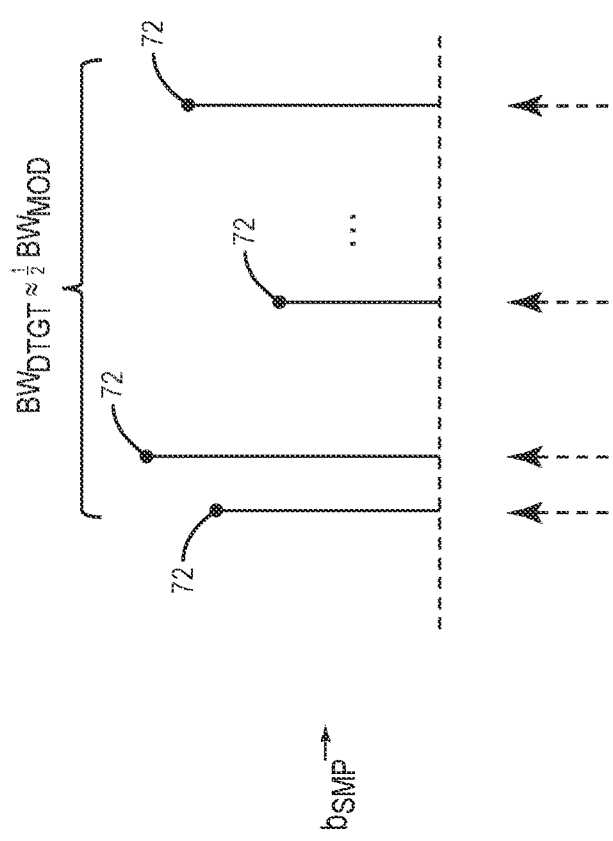
FIG. 4B
FIG. 4A

BANDWIDTH ADAPTATION IN A TRANSMISSION CIRCUIT

RELATED APPLICATIONS

This application claims the benefit of U.S. provisional patent application Ser. No. 63/329,997, filed on Apr. 12, 2022, the disclosure of which is hereby incorporated herein by reference in its entirety.

FIELD OF THE DISCLOSURE

The technology of the disclosure relates generally to a transmission circuit that amplifies and transmits a radio frequency (RF) signal modulated across a wide range of modulation bandwidth.

BACKGROUND

Mobile communication devices have become increasingly common in current society for providing wireless communication services. The prevalence of these mobile communication devices is driven in part by the many functions that are now enabled on such devices. Increased processing capability in such devices means that mobile communication devices have evolved from being pure communication tools into sophisticated mobile multimedia centers that enable enhanced user experiences.

The redefined user experience relies on a higher data rate offered by advanced fifth generation (5G) and 5G new radio (5G-NR) technologies, which typically transmit and receive radio frequency (RF) signals in millimeter wave spectrums. Given that the RF signals are more susceptible to attenuation and interference in the millimeter wave spectrums, the RF signals are typically amplified by state-of-the-art power amplifiers to help boost the RF signals to a higher power before transmission.

Envelope tracking (ET) is a power management technology designed to improve operating efficiency and/or linearity performance of the power amplifiers. In an ET power management circuit, a power management integrated circuit (PMIC) is configured to generate a time-variant ET voltage based on a time-variant voltage envelope of the RF signals, and the power amplifiers are configured to amplify the RF signals based on the time-variant ET voltage. Understandably, the better the time-variant ET voltage is aligned with the time-variant voltage envelope in time and amplitude, the better the performance (e.g., efficiency and/or linearity) that can be achieved at the power amplifiers. However, the time-variant ET voltage can become misaligned from the time-variant voltage envelope in time and/or amplitude due to a range of factors (e.g., group delay, impedance mismatch, etc.). As such, it is desirable to always maintain good alignment between the time-variant voltage and the time-variant voltage envelope and across a wide modulation bandwidth.

SUMMARY

Embodiments of the disclosure relate to bandwidth adaptation in a transmission circuit. The transmission circuit includes a power amplifier circuit that amplifies a radio frequency (RF) signal based on a modulated voltage, an envelope tracking integrated circuit (ETIC) that generates the modulated voltage based on a modulated target voltage, and a transceiver circuit that generates the RF signal and the modulated target voltage. Herein, the RF signal may be modulated in a wide modulation bandwidth (e.g., 400 MHZ) but the ETIC may have a bandwidth limit lower than the modulation bandwidth of the RF signal, which can lead to distortion in the modulated voltage and, consequently, in the RF signal. In this regard, the transceiver circuit is configured to generate the modulated target voltage in a lower bandwidth than the bandwidth limit when the modulation bandwidth of the RF signal exceeds the bandwidth limit of the ETIC. The transceiver circuit may add a compensation term in the modulated target to suppress a ripple in the modulated voltage due to the bandwidth manipulation. As such, the transmission circuit can process the RF signal across the wide modulation bandwidth without causing distortion in the RF signal.

In one aspect, a transmission circuit is provided. The transmission circuit includes a power amplifier circuit. The power amplifier circuit is configured to amplify an RF signal based on a modulated voltage. The transmission circuit also includes an ETIC. The ETIC is configured according to a defined bandwidth limit to generate the modulated voltage based on a modulated target voltage. The transmission circuit also includes a transceiver circuit. The transceiver circuit includes a signal processing circuit. The signal processing circuit is configured to modulate the RF signal to a signal modulation bandwidth based on a time-variant modulation vector. The transceiver circuit also includes a voltage processing circuit. The voltage processing circuit is configured to cause the modulated target voltage to be generated in a target voltage bandwidth that is lower than or equal to the defined bandwidth limit of the ETIC when the signal modulation bandwidth is higher than the defined bandwidth limit of the ETIC.

In another aspect, a transceiver circuit is provided. The transceiver circuit includes a signal processing circuit. The signal processing circuit is configured to modulate an RF signal to a signal modulation bandwidth based on a time-variant modulation vector. The RF signal is amplified by a power amplifier circuit based on a modulated voltage generated by an ETIC based on a modulated target voltage. The transceiver circuit also includes a voltage processing circuit. The voltage processing circuit is configured to cause the modulated target voltage to be generated in a target voltage bandwidth that is lower than or equal to a defined bandwidth limit of the ETIC when the signal modulation bandwidth is higher than the defined bandwidth limit of the ETIC.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIGS. 4A and 4B are graphic diagrams providing exemplary illustrations of the modulation bandwidth adaptation performed in the transceiver circuit of FIG. 3;

DETAILED DESCRIPTION

Figure 1A:
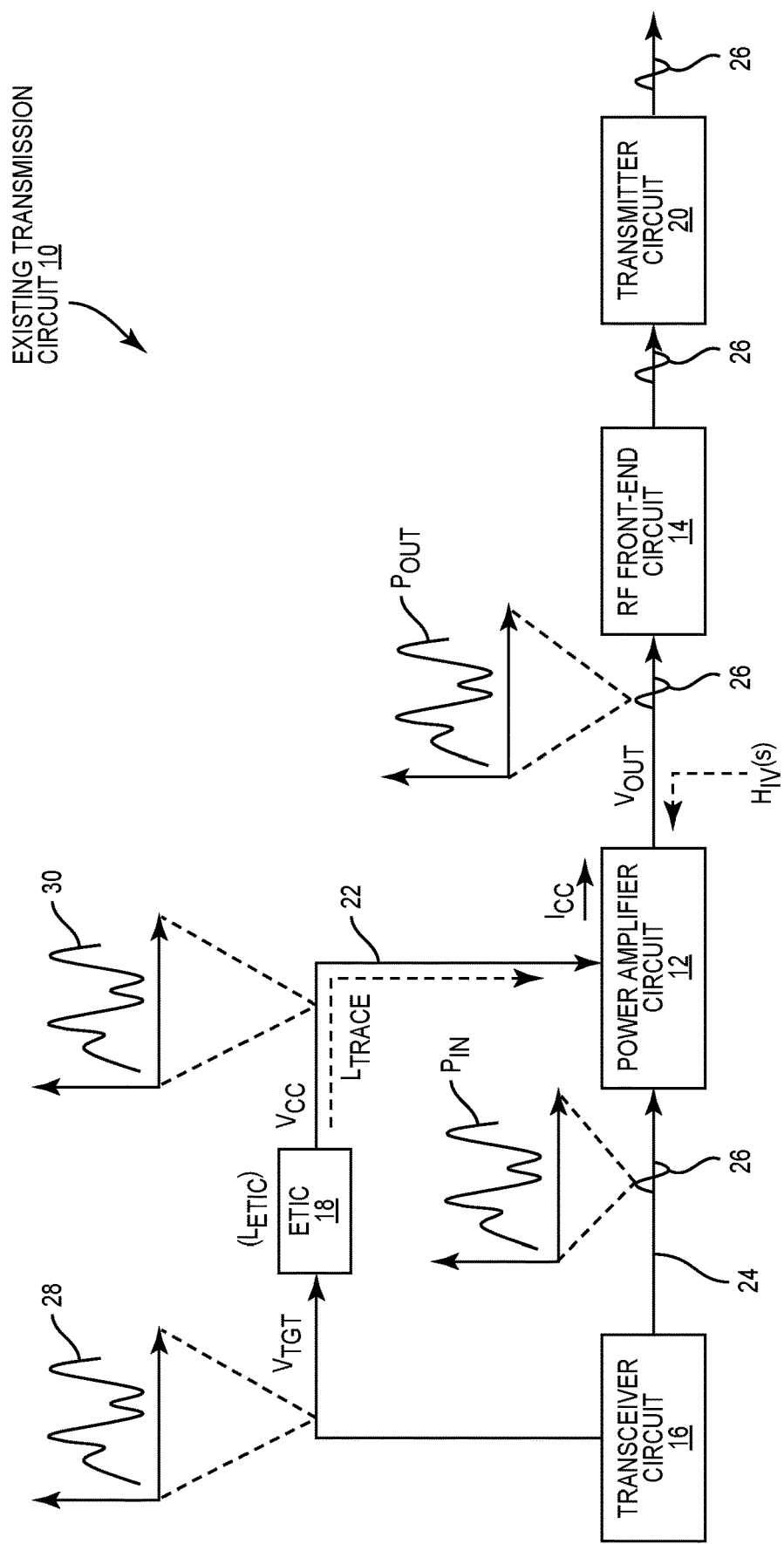
FIG. 1A is a schematic diagram of an exemplary existing transmission circuit, wherein an unwanted voltage distortion filter and a total inductive impedance presented to a power amplifier circuit can cause a memory distortion in the power amplifier circuit when the power amplifier circuit is coupled to a radio frequency (RF) front-end circuit.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments of the disclosure relate to bandwidth adaptation in a transmission circuit. The transmission circuit includes a power amplifier circuit that amplifies a radio frequency (RF) signal based on a modulated voltage, an envelope tracking integrated circuit (ETIC) that generates the modulated voltage based on a modulated target voltage, and a transceiver circuit that generates the RF signal and the modulated target voltage. Herein, the RF signal may be modulated in a wide modulation bandwidth (e.g., 400 MHZ) but the ETIC may have a bandwidth limit lower than the modulation bandwidth of the RF signal, which can lead to distortion in the modulated voltage and, consequently, in the RF signal. In this regard, the transceiver circuit is configured to generate the modulated target voltage in a lower bandwidth than the bandwidth limit when the modulation bandwidth of the RF signal exceeds the bandwidth limit of the ETIC. The transceiver circuit may add a compensation term in the modulated target to suppress a ripple in the modulated voltage due to the bandwidth manipulation. As such, the transmission circuit can process the RF signal across the wide modulation bandwidth without causing distortion in the RF signal.

Figure 2:
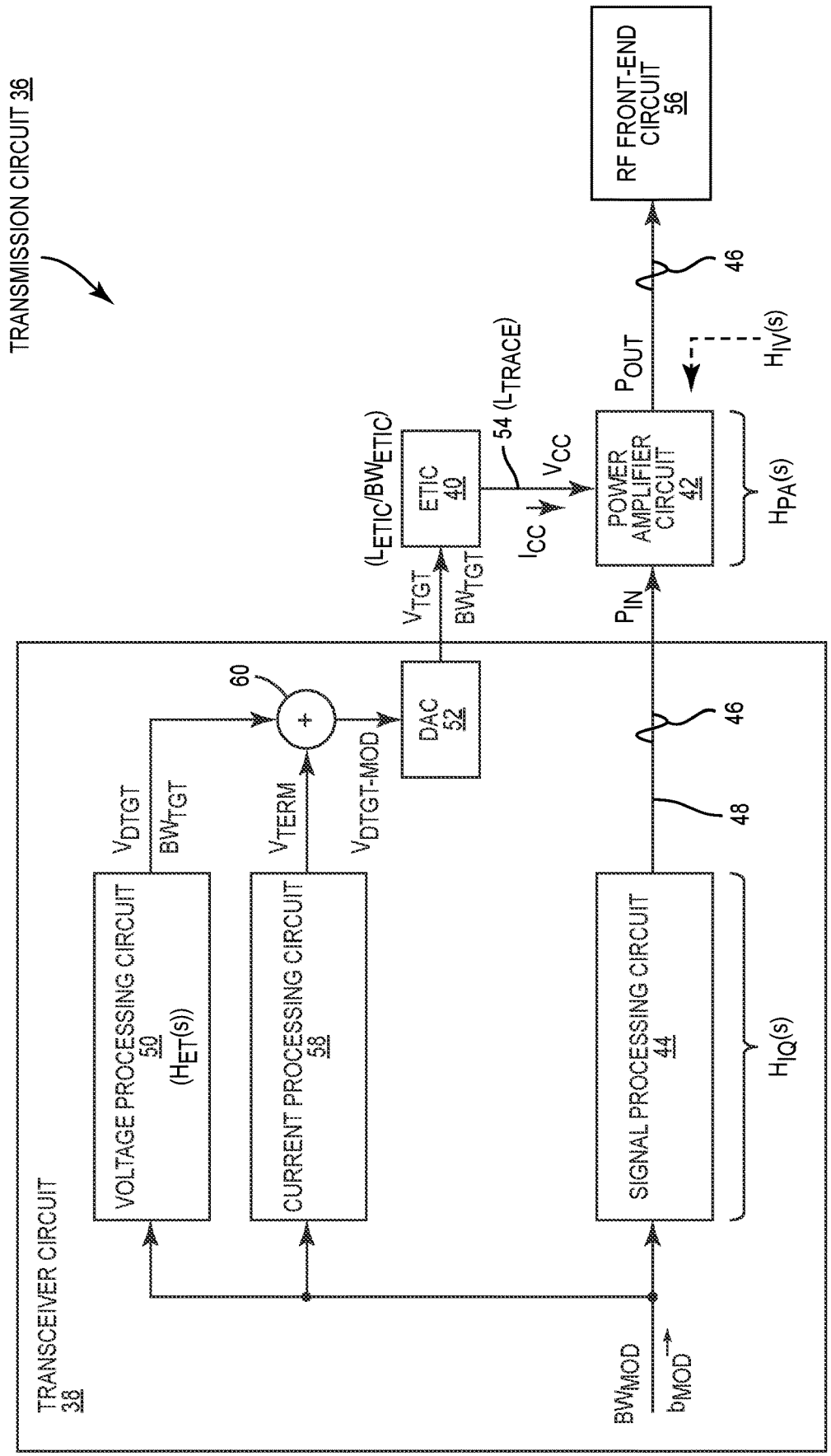
FIG. 2 is a schematic diagram of an exemplary transmission circuit that can be configured according to various embodiments of the present disclosure to support modulation bandwidth adaptation and cancel the memory distortion in the existing transmission circuit of FIG. 1A.

Before discussing the transmission circuit according to the present disclosure, starting at FIG. 2, a brief discussion of an existing transmission circuit is first provided to help understand how an unwanted voltage distortion filter and a total inductive impedance may become memory effect contributors that can degrade overall RF performance of the existing transmission circuit. Herein, a "memory effect" refers to a phenomenon that causes an electrical circuit (e.g., a power amplifier circuit) to generate an output signal that depends not only on a present input signal, but also on a past input signal(s). Accordingly, a degradation to the output signal caused by the memory effect is referred to as a "memory distortion" hereinafter.

FIG. 1A is a schematic diagram of an exemplary existing transmission circuit 10, wherein an unwanted voltage distortion filter $H_{IV}(s)$ and a total inductive impedance ($L_{ETIC}$+ $L_{TRACE}$) presented to a power amplifier circuit 12 can cause a memory distortion in the power amplifier circuit 12 when the power amplifier circuit 12 is coupled to an RF front-end circuit 14. Notably, in the unwanted voltage distortion filter $H_{IV}(s)$, "s" is a notation of Laplace transform.

The existing transmission circuit 10 includes a transceiver circuit 16, an ETIC 18, and a transmitter circuit 20, which can include an antenna(s) (not shown) as an example. The ETIC 18 is coupled to the power amplifier circuit 12 via a conductive voltage path 22 and the transceiver circuit 16 is coupled to the power amplifier circuit 12 via a conductive signal path 24. The ETIC 18 can be associated with an inductive ETIC impedance $L_{ETIC}$ and the conductive voltage path 22 can be associated with an inductive trace impedance $L_{TRACE}$. As such, the ETIC 18 and the conductive voltage path 22 can collectively present the total inductive impedance ($L_{ETIC}+L_{TRACE}$) to the power amplifier circuit 12.

The transceiver circuit 16 is configured to generate an RF signal 26 having a time-variant input power $P_{IN}$ and provides the RF signal 26 to the power amplifier circuit 12 via the conductive signal path 24. The transceiver circuit 16 is also configured to generate a time-variant target voltage $V_{TGT}$, which is associated with a time-variant target voltage envelope 28 that tracks the time-variant input power $P_{IN}$ of the RF signal 26. The ETIC 18 is configured to generate a modulated voltage $V_{CC}$ having a time-variant modulated voltage envelope 30 that tracks the time-variant target voltage envelope 28 of the time-variant target voltage $V_{TGT}$ and provides the modulated voltage $V_{CC}$ to the power amplifier circuit 12 via the conductive voltage path 22.

The power amplifier circuit 12, on the other hand, generates a modulated current $I_{CC}$ as a function of the time-variant input power $P_{IN}$. Accordingly, the power amplifier circuit 12 can amplify the RF signal 26 to a time-variant output power $P_{OUT}$ as a function of a time-variant output voltage $V_{OUT}$ and the modulated current $I_{CC}$ (e.g., $P_{OUT}=V_{OUT}*I_{CC}$). The power amplifier circuit 12 then provides the amplified RF signal 26 to the RF front-end circuit 14. The RF front-end circuit 14 may be a filter circuit that performs further frequency filtering on the amplified RF signal 26 before providing the amplified RF signal 26 to the transmitter circuit 20 for transmission.

Figure 1B:
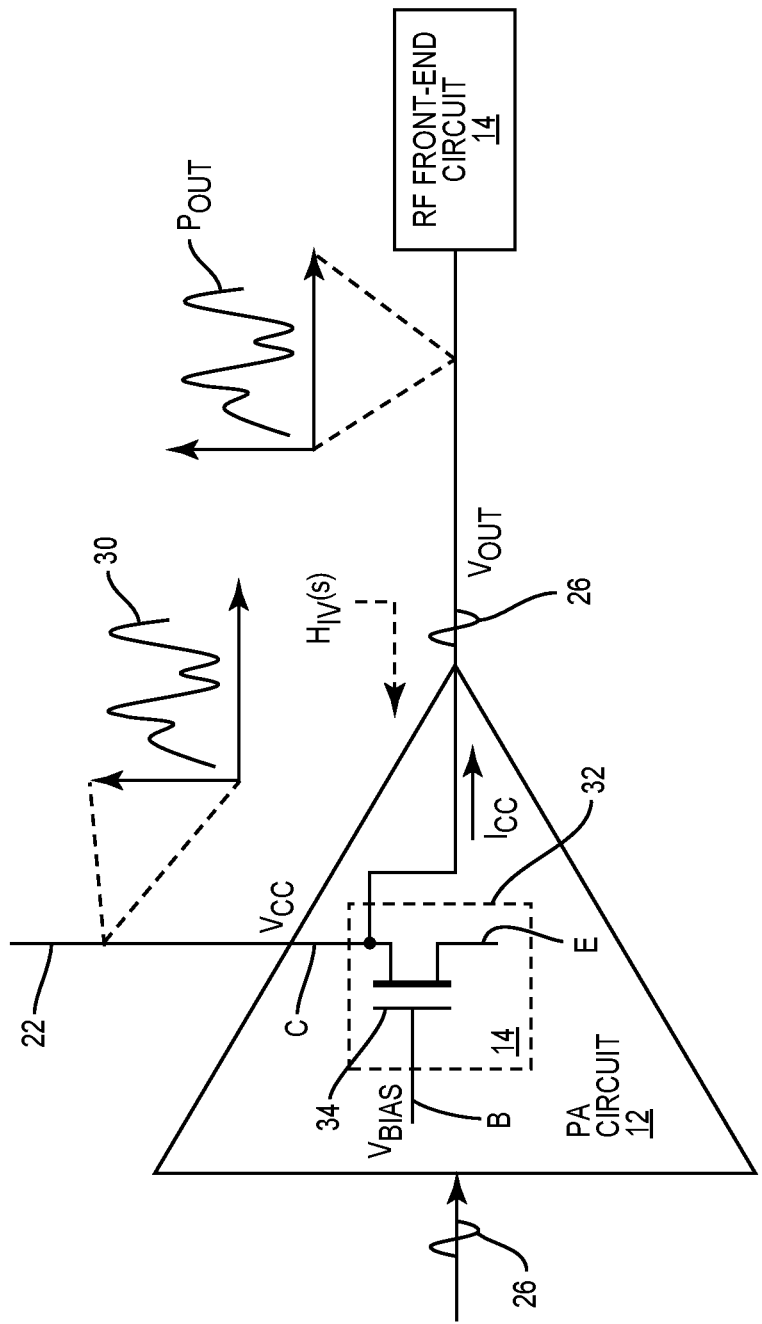
FIG. 1B is a schematic diagram providing an exemplary illustration of an output stage of the power amplifier circuit in FIG. 1A.

FIG. 1B is a schematic diagram providing an exemplary illustration of an output stage 32 of the power amplifier circuit 12 in FIG. 1A. Common elements between FIGS. 1A and 1B are shown therein with common element numbers and will not be re-described herein.

The output stage 32 can include at least one transistor 34, such as a bipolar junction transistor (BJT) or a complementary metal-oxide semiconductor (CMOS) transistor. Taking the BJT as an example, the transistor 34 can include a base electrode B, a collector electrode C, and an emitter electrode E. The base electrode B is configured to receive a bias voltage $V_{BIAS}$ and the collector electrode C is coupled to the conductive voltage path 22 to receive the modulated voltage $V_{CC}$. The collector electrode C is also coupled to the RF front-end circuit 14 and configured to output the amplified RF signal 26 at the time-variant output voltage $V_{OUT}$. In this regard, the time-variant output voltage $V_{OUT}$ can be a function of the modulated voltage $V_{CC}$. Accordingly, the time-variant output power $P_{OUT}$ also becomes a function of the modulated voltage $V_{CC}$ and the modulated current $I_{CC}$. Understandably, the power amplifier circuit 12 will operate with good efficiency and linearity when the time-variant modulated voltage $V_{CC}$ and the modulated current $I_{CC}$ are both aligned with the time-variant input power $P_{IN}$.

With reference back to FIG. 1A, the voltage distortion filter $H_{IV}(s)$ and the total inductive impedance ($L_{ETIC}+L_{TRACE}$) are both memory effect contributors that can cause degraded RF performance in the existing transmission circuit 10. On one hand, the voltage distortion filter $H_{IV}(s)$ is created when the power amplifier circuit 12 is coupled to the RF front-end circuit 14. As described in U.S. patent application Ser. No. 17/700,685, entitled "WIDEBAND TRANSMISSION CIRCUIT" (hereinafter "Application685"), the voltage distortion filter $H_{IV}(s)$ can alter the time-variant output voltage $V_{OUT}$ across an entire modulation bandwidth of the RF signal 26. As a result, the time-variant output voltage $V_{OUT}$ may become misaligned from the modulated voltage $V_{CC}$ across the modulation bandwidth of the RF signal 26, thus causing unwanted memory distortion in the RF signal 26.

On another hand, the total inductive impedance ($L_{ETIC}+L_{TRACE}$) can interact with the modulated current $I_{CC}$ to create a ripple in the modulated voltage $V_{CC}$ at the collector electrode C of the transistor 34. In this regard, it is desirable to suppress the unwanted voltage distortion filter $H_{IV}(s)$ and the ripple in the modulated voltage $V_{CC}$ to help improve RF performance of the existing transmission circuit 10.

Notably, the RF signal 26 may be modulated in a wide range of modulation bandwidth based on different wireless communication technologies. For example, the RF signal 26 can be modulated below 100 MHz bandwidth for transmission in a fourth generation (4G) communication system or above 400 MHz bandwidth for transmission in a fifth generation (5G) communication system. In the meantime, the ETIC 18 may be configured to operate based on a defined bandwidth limit (e.g., 100 MHZ) that is far below the upper end (e.g., 400 MHz) of the modulation bandwidth of the RF signal 26. In this regard, if the transceiver circuit 16 always generates the modulated target voltage $V_{TGT}$ based on the modulation bandwidth of the RF signal 26 regardless of the defined bandwidth limit of the ETIC 18, the modulated voltage $V_{CC}$ may be distorted to thereby cause a distortion in the amplified RF signal 26. Hence, it is desirable to adapt the modulated target voltage $V_{TGT}$ based on the modulation bandwidth of the RF signal 26 and the defined bandwidth limit of the ETIC 18, concurrent to suppressing the unwanted voltage distortion filter $H_{IV}(s)$ and the ripple in the modulated voltage $V_{CC}$.

In this regard, FIG. 2 is a schematic diagram of an exemplary transmission circuit 36 that can be configured according to various embodiments of the present disclosure to support modulation bandwidth adaptation, suppress the unwanted voltage distortion filter $H_{IV}(s)$, and cancel the ripple in the modulated voltage $V_{CC}$.

The transmission circuit 36 includes a transceiver circuit 38, an ETIC 40, and a power amplifier circuit 42. The transceiver circuit 38 includes a signal processing circuit 44. The signal processing circuit 44 receives a time-variant modulation vector $\vec{b}_{MOD}$ (e.g., from a baseband processor) modulated in a signal modulation bandwidth $BW_{MOD}$ and generates an RF signal 46 from the time-variant modulation vector $\vec{b}_{MOD}$. Given that the RF signal 46 is generated from the time-variant modulation vector $\vec{b}_{MOD}$, the modulation bandwidth of the RF signal 46 is substantially identical to the signal modulation bandwidth $BW_{MOD}$ of the time-variant modulation vector $\vec{b}_{MOD}$. The signal processing circuit 44 is further configured to provide the RF signal 46 to the power amplifier circuit 42 via a conductive signal path 48.

The transceiver circuit 38 also includes a voltage processing circuit 50. The voltage processing circuit 50 receives the time-variant modulation vector $\vec{b}_{MOD}$ and generates a modulated digital target voltage $V_{DTGT}$ based on the time-variant modulation vector $\vec{b}_{MOD}$. Given that the modulated digital target voltage $V_{DTGT}$ is generated based on the time-variant modulation vector $\vec{b_{MOD}}$, the modulated digital target voltage $V_{DTGT}$ will be associated with a target voltage bandwidth $BW_{TGT}$ that is also substantially identical to the signal modulation bandwidth $BW_{MOD}$ of the time-variant modulation vector $\vec{b_{MOD}}$.

The transceiver circuit 38 further includes a digital-to-analog converter (DAC) 52. The DAC 52 is configured to convert the modulated digital target voltage $V_{DTGT}$ to the modulated target voltage $V_{TGT}$ and provide the modulated target voltage $V_{TGT}$ to the ETIC 40. Given that the modulated voltage $V_{TGT}$ is converted from the modulated digital target voltage $V_{DTGT}$, the modulated voltage $V_{TGT}$ will likewise be associated with the target voltage bandwidth $BW_{TGT}$.

The ETIC 40, which may be functionally equivalent to the ETIC 18 in FIG. 1A, is configured according to a defined bandwidth limit $BW_{ETIC}$ to generate a modulated voltage $V_{CC}$ based on the modulated target voltage $V_{TGT}$ and provide the modulated voltage $V_{CC}$ to the power amplifier circuit 42 via a conductive path 54 (e.g., a conductive trace). Like the ETIC 18 and the conductive voltage path 22 in FIG. 1A, the ETIC 40 is associated with an inherent inductive impedance $L_{ETIC}$ and the conductive path 54 is associated with an inductive trace impedance $L_{TRACE}$. As a result, the ETIC 40 and the conductive path 54 can collectively present a total inductive impedance ($L_{ETIC}+L_{TRACE}$) to the power amplifier circuit 42.

The power amplifier circuit 42 may be functionally equivalent to the power amplifier circuit 12 in FIG. 1A. As such, the power amplifier circuit 42 also includes the output stage 32, as previously illustrated in FIG. 1B, and is configured to amplify the RF signal 46 from a time-variant input power $P_{IN}$ to a time-variant output power $P_{OUT}$ based on the modulated voltage $V_{CC}$ and a modulated current $I_{CC}$, which is generated inside the power amplifier circuit 42 as a function of the time-variant input power $P_{IN}$.

In a non-limiting example, the signal modulation bandwidth $BW_{MOD}$ of the RF signal 46 can range from below 100 MHz to above 400 MHz. In contrast, the defined bandwidth limit $BW_{ETIC}$ of the ETIC 40 may only be 100 MHz, as an example. In this regard, if the transceiver circuit 38 always generates the modulated target voltage $V_{TGT}$ with the target voltage bandwidth $BW_{TGT}$ that is substantially identical to the signal modulation bandwidth $BW_{MOD}$, the ETIC 40 may be forced to chop off a portion of the target voltage bandwidth $BW_{TGT}$, thus causing a distortion in the modulated voltage $V_{CC}$. Consequently, when the power amplifier circuit 42 amplifies the RF signal 46 based on the distorted modulated voltage $V_{CC}$, the amplified RF signal 46 may be distorted as well.

In an embodiment, the voltage processing circuit 50 is configured to cause the modulated target voltage $V_{TGT}$ to be generated in the target voltage bandwidth $BW_{TGT}$ that is lower than or equal to the defined bandwidth limit $BW_{ETIC}$ of the ETIC 40 when the signal modulation bandwidth $BW_{MOD}$ is higher than the defined bandwidth limit $BW_{ETIC}$ of the ETIC 40. In contrast, when the signal modulation bandwidth $BW_{MOD}$ is lower than or equal to the defined bandwidth limit $BW_{ETIC}$ of the ETIC 40, the voltage processing circuit 50 is configured to cause the modulated target voltage $V_{TGT}$ to be generated in the target voltage bandwidth $BW_{TGT}$ that is substantially equal to the signal modulation bandwidth $BW_{MOD}$. In this regard, the transmission circuit 36 can be adapted to process the signal modulation bandwidth $BW_{MOD}$ using a wide range of modulation bandwidth, regardless of the bandwidth limitation of the ETIC 40.

Like in the existing transmission circuit 10 of FIG. 1A, the modulated current $I_{CC}$ can also interact with the total inductive impedance ($L_{ETIC}+L_{TRACE}$) to cause a ripple in the modulated voltage $V_{CC}$. In addition, the ripple in the modulated voltage $V_{CC}$ can become worse when the modulated voltage $V_{CC}$ is generated based on the reduced target voltage bandwidth $BW_{TGT}$. Further, as the power amplifier circuit 42 is also coupled to an RF front-end circuit 56, the unwanted voltage distortion filter $H_{IV}(s)$ is also present at the power amplifier circuit 42. In this regard, concurrent to adapting the target voltage bandwidth $BW_{TGT}$ based on the defined bandwidth limit $BW_{ETIC}$ and the signal modulation bandwidth $BW_{MOD}$, it is also necessary to cancel the ripple in the modulated voltage $V_{CC}$ and suppress the unwanted voltage distortion filter $H_{IV}(s)$ to help improve overall RF performance of the transmission circuit 36.

In this regard, in an embodiment, the voltage processing circuit 50 is further configured to apply a complex voltage filter $H_{ET}(s)$ to the time-variant modulation vector $\vec{b_{MOD}}$ and generate the modulated digital target voltage $V_{DTGT}$ thereafter. The complex voltage filter $H_{ET}(s)$, which can be expressed in equation (Eq. 1) below, is determined to compensate for the voltage distortion filter $H_{IV}(s)$ presented to the power amplifier circuit 42 by coupling the power amplifier circuit 42 to the RF front-end circuit 56.

$$H_{ET}(s)=H_{IQ}(s)*H_{PA}(s)*H_{IV}(s) \tag{Eq. 1}$$

In the equation (Eq. 1), $H_{IQ}(s)$ represents a transfer function of the signal processing circuit 44, and $H_{PA}(s)$ represents a voltage gain transfer function of the power amplifier circuit 42. In this regard, $H_{ET}(s)$ is a combined complex filter configured to match a combined filter that includes the transfer function $H_{IQ}(s)$, the voltage gain transfer function $H_{PA}(s)$, and the voltage distortion filter $H_{IV}(s)$. For a more detailed description as to how the voltage distortion filter $H_{IV}(s)$ was created and how the complex voltage filter $H_{ET}(s)$ can effectively suppress the voltage distortion filter $H_{IV}(s)$, please refer to the Application685.

To cancel the ripple in the modulated voltage $V_{CC}$, the transceiver circuit 38 is further configured to include a current processing circuit 58. The current processing circuit 58 is configured to determine a compensation term $V_{TERM}$ based on the modulated voltage $V_{CC}$ and the total inductive impedance ($L_{ETIC}+L_{TRACE}$). In a non-limiting example, the compensation term $V_{TERM}$ IS associated with a full modulation bandwidth of the transmission circuit 36 to thereby cancel the ripple across the wide modulation bandwidth $BW_{MOD}$ of the RF signal 46.

The transceiver circuit 38 can further include a combiner 60 to combine the compensation term $V_{TERM}$ with the modulated digital target voltage $V_{DTGT}$ to create a modified digital target voltage $V_{DTGT-MOD}$. Accordingly, the DAC 52 can convert the modified digital target voltage $V_{DTGT-MOD}$ (instead of the modulated digital target voltage $V_{DTGT}$) into the modulated target voltage $V_{TGT}$. By adding the compensation term $V_{TERM}$ into the modulated target voltage $V_{TGT}$, it is possible to cancel the ripple in the modulated voltage $V_{CC}$ received by the power amplifier circuit 42.

Specific embodiments of the transceiver circuit 38 are discussed below with reference to FIGS. 3 and 4. Common elements between FIGS. 2, 3, and 4 are shown therein with common element numbers and will not be re-described herein.

Figure 3:
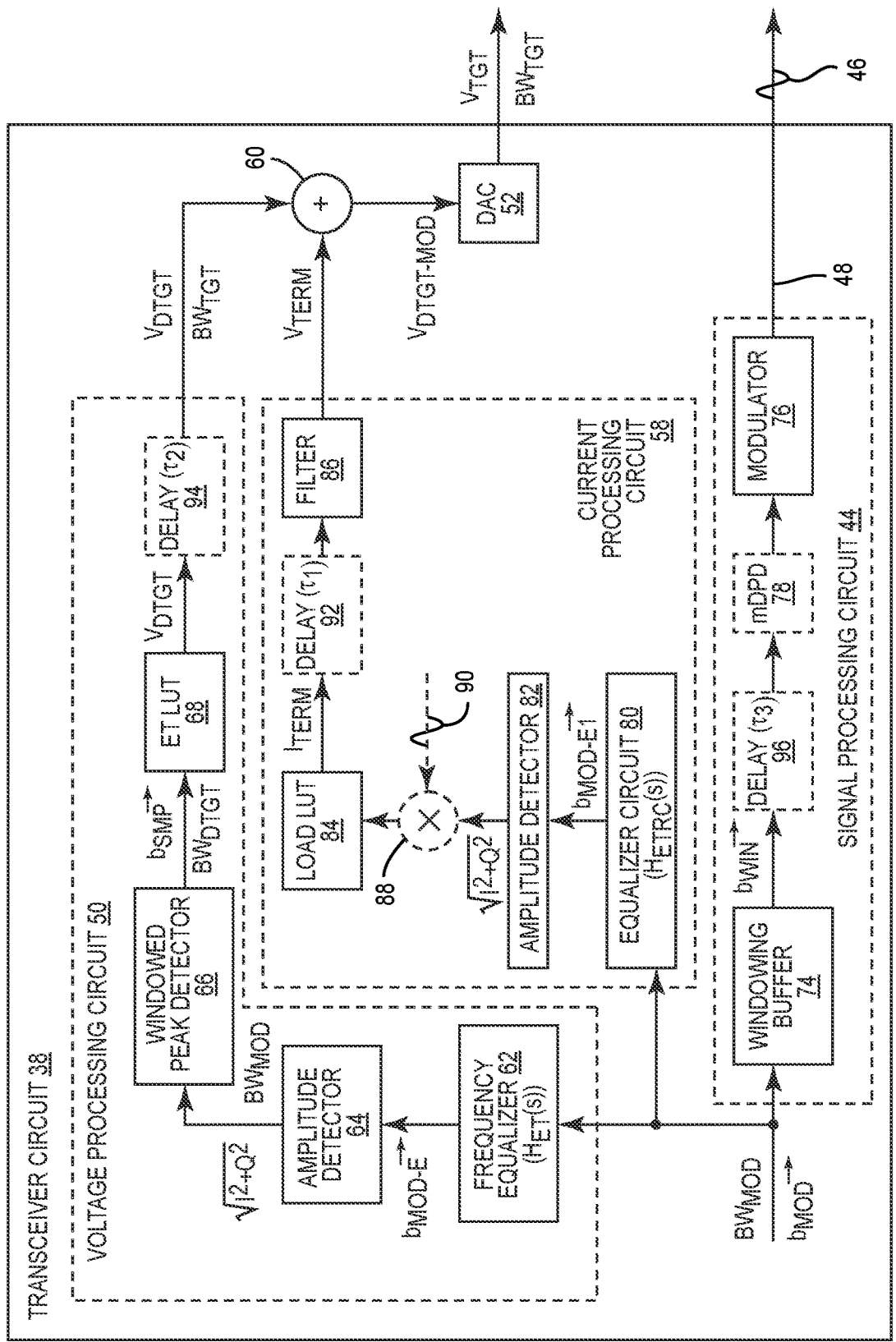
FIG. 3 is a schematic diagram providing an exemplary illustration of a transceiver circuit in the transmission circuit of FIG. 2, which is configured according to one embodiment of the present disclosure to support modulation bandwidth adaptation in the transmission circuit of FIG. 2.

FIG. 3 is a schematic diagram providing an exemplary illustration of the transceiver circuit 38 configured according to one embodiment of the present disclosure to support modulation bandwidth adaptation in the transmission circuit

36 of FIG. 2. Herein, the voltage processing circuit 50 includes a frequency equalizer circuit 62, an amplitude detector 64, a windowed peak detector circuit 66, and an ET lookup table (LUT) circuit 68. The frequency equalizer circuit 62 is configured to apply the complex voltage filter $H_{ET}(s)$ to the time-variant modulation vector $\vec{b}_{MOD}$ to generate a frequency-equalized modulation vector $\vec{b}_{MOD\text{-}E}$, which is also associated with the signal modulation bandwidth $BW_{MOD}$. The amplitude detector 64 is configured to detect a time-variant amplitude $\sqrt{I^2+Q^2}$ from the frequency-equalized modulation vector $\vec{b}_{MOD\text{-}E}$ that is also associated with the signal modulation bandwidth $BW_{MOD}$.

The windowed peak detector circuit 66 is configured to cause the target voltage bandwidth $BW_{DTGT}$ in the modulated digital target voltage $V_{DTGT}$ to be adapted based on the defined bandwidth limitation $BW_{ETIC}$ and the signal modulation bandwidth $BW_{MOD}$. FIGS. 4A and 4B are graphic diagrams providing exemplary illustrations of the modulation bandwidth adaptation performed in the transceiver circuit 38 of FIG. 3. Elements in FIGS. 2 and 3 are referenced in conjunction with the description of FIGS. 4A and 4B and will not be re-described herein.

FIG. 4A illustrates the time-variant amplitude $\sqrt{I^2+Q^2}$ as detected from the frequency-equalized modulation vector $\vec{b}_{MOD\text{-}E}$. In an embodiment, the time-variant amplitude $\sqrt{I^2+Q^2}$ is divided into multiple sampling windows $W_1$-$W_N$. Notably, the sampling windows $W_1$-$W_N$ are non-overlapping windows each including one or more amplitude samples 70 of the time-variant amplitude $\sqrt{I^2+Q^2}$ defined by a grouping factor K (K=1, 2, or 4).

The grouping factor K is determined based on a relationship between the defined bandwidth limitation $BW_{ETIC}$ and the signal modulation bandwidth $BW_{MOD}$. When the signal modulation bandwidth $BW_{MOD}$ is lower than or equal to the defined bandwidth limitation $BW_{ETIC}$ ($BW_{MOD} \leq BW_{ETIC}$), the grouping factor K will be equal to one (1). As such, each of the sampling windows $W_1$-$W_N$ will include only 1 amplitude sample 70 of the time-variant amplitude $\sqrt{I^2+Q^2}$. In contrast, when the signal modulation bandwidth $BW_{MOD}$ is higher than the defined bandwidth limitation $BW_{ETIC}$ ($BW_{MOD} > BW_{ETIC}$), the grouping factor K will be greater than 1. As such, each of the sampling windows $W_1$-$W_N$ will include multiple amplitude samples 70 of the time-variant amplitude $\sqrt{I^2+Q^2}$.

As an example, FIG. 4A illustrates modulation bandwidth adaptation performed by the voltage generation circuit 50 based on a grouping factor K=2, which means that each of the sampling windows $W_1$-$W_N$ includes two amplitude samples 70 of the time-variant amplitude $\sqrt{I^2+Q^2}$. In a non-limiting example, the grouping factor K is set to equal 2 when the signal modulation bandwidth $BW_{MOD}$ is approximately twice the defined bandwidth limitation $BW_{ETIC}$ ($BW_{MOD} \approx 2 \times BW_{ETIC}$). In this regard, the windowed peak detector circuit 66 is configured to detect a peak amplitude 72 among the amplitude samples 70 of the equalized modulation vector $\vec{b}_{MOD\text{-}E}$ in each of the sampling windows $W_1$-$W_N$. Accordingly, as illustrated in FIG. 4B, the windowed peak detector circuit 66 can generate a sampled modulation vector $\vec{b}_{SMP}$ in the target voltage bandwidth $BW_{TGT}$ based on the peak amplitude 72 detected in each of the sampling windows $W_1$-$W_N$.

In this example, since the grouping factor K is equal to 2, the target voltage bandwidth $BW_{TGT}$ will be approximately equal to one-half (½) of the signal modulation bandwidth $BW_{MOD}$. More generally speaking, the target voltage bandwidth $BW_{TGT}$ will be approximately equal to one-Kth of the signal modulation bandwidth $BW_{MOD}$ ($BW_{TGT} = BW_{MOD}/K$). Notably, when K=1, the target voltage bandwidth $BW_{TGT}$ will be equal to the signal modulation bandwidth $BW_{MOD}$. Thus, by properly determining the grouping factor K based on the defined bandwidth limit $BW_{ETIC}$ and the signal modulation bandwidth $BW_{MOD}$, it is possible to prevent the ETIC 40 from being forced to limit the bandwidth of the modulated voltage $V_{CC}$ to thereby prevent distortion in the modulated voltage $V_{CC}$.

With reference back to FIG. 3, the ET LUT circuit 68 may include an LUT (not shown) that correlates different levels of the peak amplitudes 72 detected in the sampling windows $W_1$-$W_N$ with different levels of the modulated digital target voltage $V_{DTGT}$. Accordingly, the ET LUT circuit 68 can generate the modulated digital target voltage $V_{DTGT}$ based on the detected peak amplitudes 72 in the sampled modulation vector $\vec{b}_{SMP}$.

In an embodiment, the signal processing circuit 44 includes a windowing buffer 74 and a modulator circuit 76. The windowing buffer 74 may be configured to temporally buffer an equal number of the amplitude samples of the time-variant modulation vector $\vec{b}_{MOD}$ as the amplitude samples 70 of the equalized modulation vector $\vec{b}_{MOD\text{-}E}$ in each of the sampling windows $W_1$-$W_N$.

In the example illustrated in FIGS. 4A and 4B, each of the sampling windows $W_1$-$W_N$ includes two amplitude samples 70 of the equalized modulation vector $\vec{b}_{MOD\text{-}E}$. In this regard, the windowing buffer 74 will buffer two amplitude samples of the time-variant modulation vector $\vec{b}_{MOD}$ as well. Accordingly, the windowing buffer 74 will generate a windowed modulation vector $\vec{b}_{WIN}$ that may be time synchronized with the sampled modulation vector $\vec{b}_{SMP}$. Subsequently, the modulator circuit 76 can be configured to generate the RF signal 46 from the windowed modulation vector $\vec{b}_{WIN}$.

The signal processing circuit 44 may further include a memory digital predistortion (mDPD) circuit 78. The mDPD circuit 78 can be configured to digitally pre-distort the windowed modulation vector $\vec{b}_{WIN}$ before the modulator circuit 76 generates the RF signal 46 from the windowed modulation vector $\vec{b}_{WIN}$.

Herein, the current processing circuit 58 includes an equalizer circuit 80, an amplitude detector circuit 82, a load LUT circuit 84, and a filter circuit 86. The equalizer circuit 80 is configured to apply a complex current filter $H_{ETRC}(s)$ to the time-variant modulation vector $\vec{b}_{MOD}$ to generate an equalized modulation vector $\vec{b}_{MOD\text{-}E1}$. Herein, the complex current filter $H_{ETRC}(s)$ may be determined to provide a different shape in frequency response within the modulation bandwidth of the transmission circuit 36. In this regard, the complex current filter $H_{ETRC}(S)$ can be different from the complex voltage filter $H_{ET}(s)$.

The amplitude detector circuit 82 is configured to detect a time-variant amplitude $\sqrt{I^2+Q^2}$ of the equalized modulation vector $\vec{b}_{MOD\text{-}E}$. The load LUT circuit 84 may include a current LUT (not shown) that is predetermined to correlate the time-variant input power $P_{IN}$ (as represented by the detected time-variant amplitude $\sqrt{I^2+Q^2}$ of the equalized modulation vector $\vec{b}_{MOD\text{-}E1}$) with different digital current terms. Accordingly, the load LUT circuit 84 can generate a time-variant digital current term $I_{TERM}$ based on the detected time-variant amplitude $\sqrt{I^2+Q^2}$ of the equalized modulation vector $\vec{b}_{MOD\text{-}E1}$. The current processing circuit 58 may include a scaler 88 to scale the detected time-variant amplitude $\sqrt{I^2+Q^2}$ based on a scaling factor 90 before the load LUT circuit 84 generates the time-variant digital current term $I_{TERM}$ from the detected time-variant amplitude $\sqrt{I^2+Q^2}$.

The filter circuit 86 is configured to convert the time-variant digital current term $I_{TERM}$ into the compensation term $V_{TERM}$. In a non-limiting example, the filter circuit 86 can be configured to convert the time-variant digital current term $I_{TERM}$ into the compensation term $V_{TERM}$ based on a Z-transform function expressed in equation (Eq. 2).

$$V_{TERM} = [(L_{ETIC} + L_{TRACE})/Ts] * (1 - z^{-1}) \quad \text{(Eq. 2)}$$

In the equation (Eq. 2), Ts represents a sampling clock period used in the digital domain, and $z^{-1}$ represents the Z transform. The combiner 55 is configured to combine the compensation term $V_{TERM}$ with the modulated digital target voltage $V_{DTGT}$ to create the modified digital target voltage $V_{DTGT-MOD}$.

In an embodiment, the current processing circuit 58 may include an adjustable delay circuit 92. The adjustable delay circuit 92 may be coupled between the load LUT circuit 84 and the filter circuit 86. The adjustable delay circuit 92 may be configured to introduce an adjustable delay term ti into the time-variant digital current term $I_{TERM}$. The adjustable delay term ti may be determined (e.g., via experiment) to cause the modulated current $I_{CC}$ to be time aligned with the modulated voltage $V_{CC}$ at the power amplifier circuit 42.

In addition, the voltage processing circuit 50 may include a second delay circuit 94 and the signal processing circuit 44 may include a third delay circuit 96. The second delay circuit 94 may be configured to introduce a second adjustable delay term 12 into the modulated digital target voltage $V_{DTGT}$. The third delay circuit 96 may be configured to introduce a third adjustable delay term $\tau_3$ into the windowed modulation vector $\vec{b_{WIN}}$. In this regard, the adjustable delay term $\tau_1$, the second adjustable delay term $\tau_2$, and/or the third adjustable delay term $\tau_3$ may be adjusted to ensure proper alignment among the modulated voltage $V_{CC}$, the modulated current $I_{CC}$, and the time-variant input power $P_{IN}$ at the power amplifier circuit 42.

Figure 5:
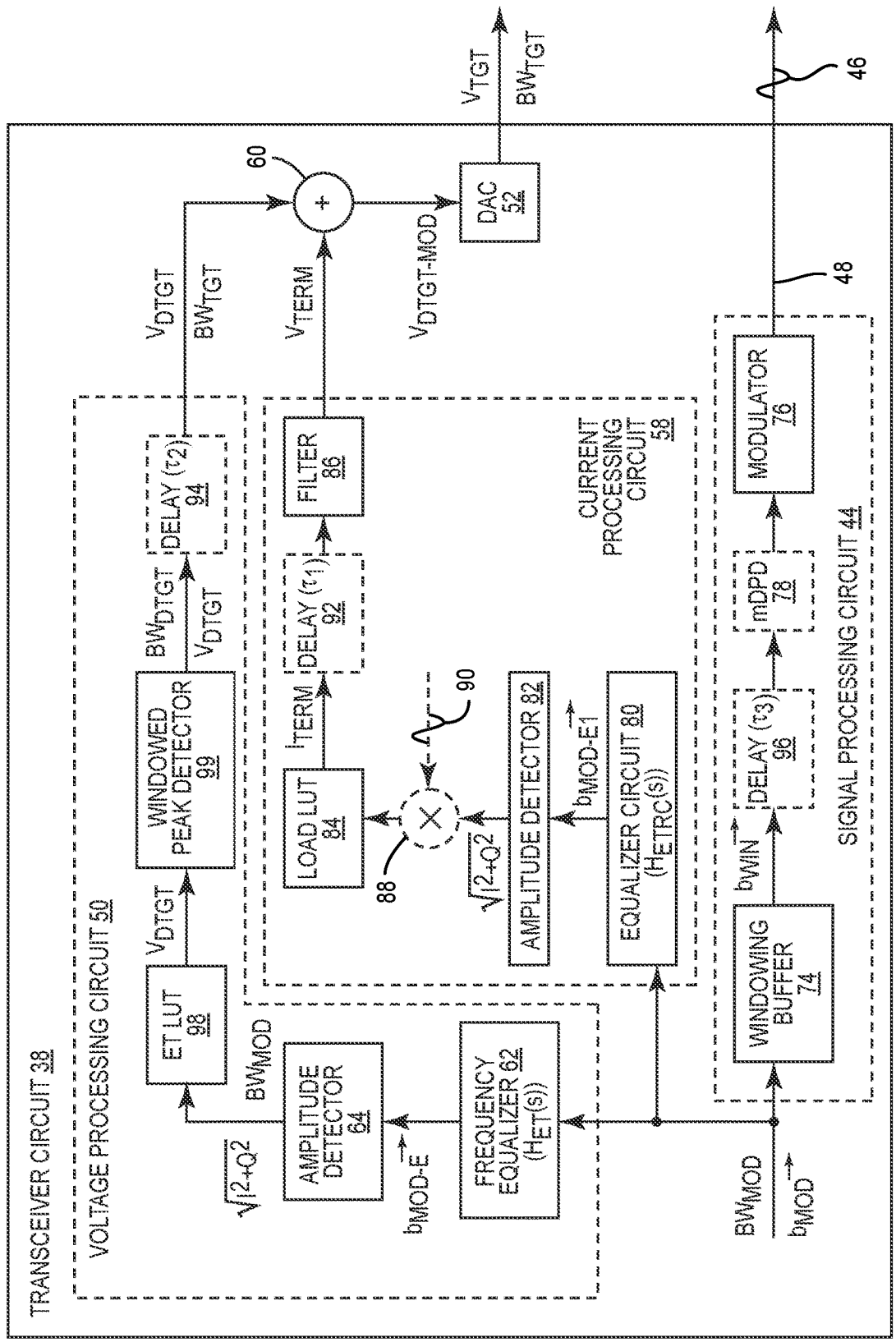
FIG. 5 is a schematic diagram providing an exemplary illustration of a transceiver circuit in the transmission circuit of FIG. 2, which is configured according to another embodiment of the present disclosure.

FIG. 5 is a schematic diagram providing an exemplary illustration of the transceiver circuit 38 configured according to one embodiment of the present disclosure. In this embodiment, the voltage processing circuit 50 is adapted to include an ET LUT circuit 98 and a windowed peak detector circuit 99. The ET LUT circuit 98 may include an LUT (not shown) that correlates a different amplitude of the equalized modulation vector $\vec{b_{MOD-E}}$ with a different level of the modulated digital target voltage $V_{DTGT}$. Accordingly, the ET LUT circuit 98 can generate the modulated digital target voltage $V_{DTGT}$ based on the equalized modulation vector $\vec{b_{MOD-E}}$.

The windowed peak detector circuit 99 is configured to detect a peak amplitude 72 among one or more amplitude samples 70 of the modulated digital target voltage $V_{DTGT}$ in each of the sampling windows $W_1$-$W_N$. Accordingly, the windowed peak detector circuit 99 can regenerate the modulated digital target voltage $V_{DTGT}$ in the target voltage bandwidth $BW_{TGT}$ based on the peak amplitude 72 detected in each of the sampling windows $W_1$-$W_N$.

Figure 6:
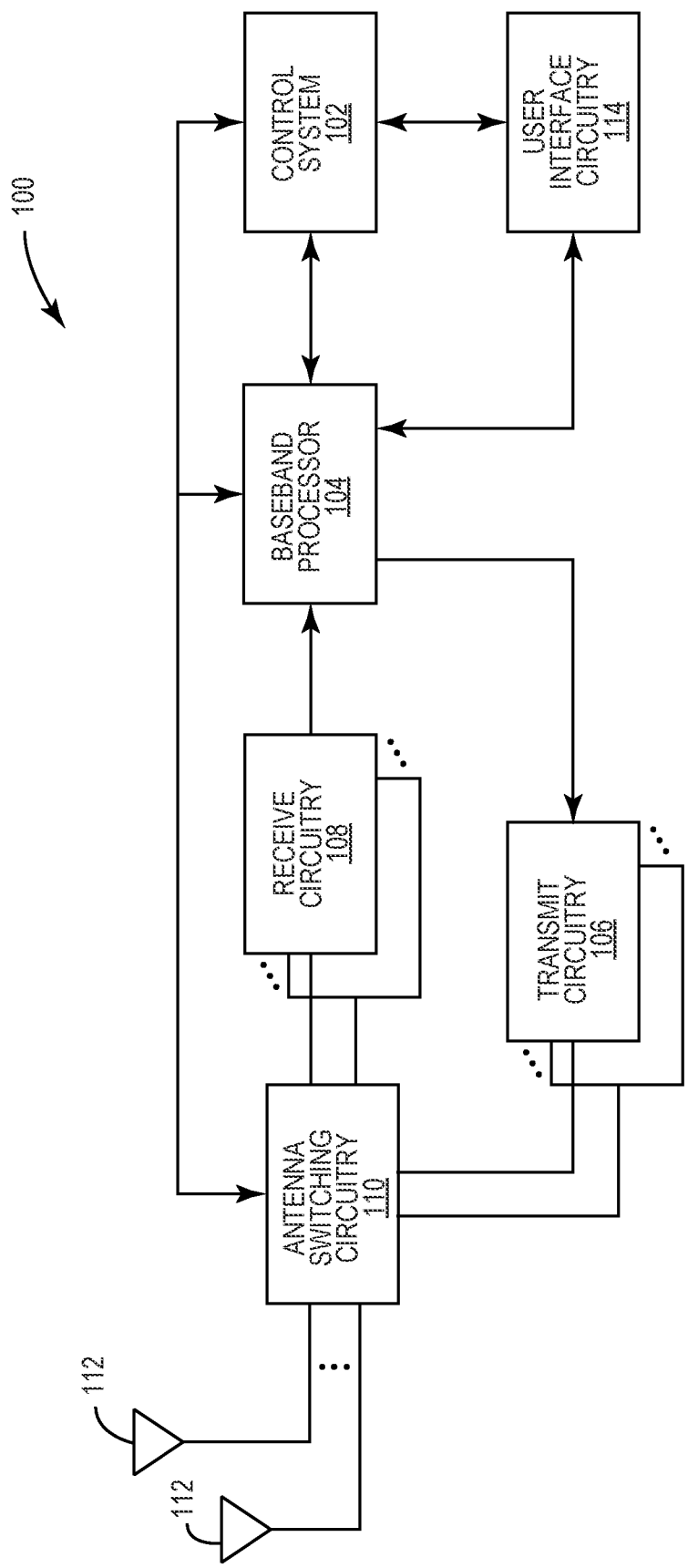
FIG. 6 is a schematic diagram of an exemplary user element wherein the transmission circuit of FIG. 2, which can include the transceiver circuits of FIGS. 3 and 5, can be provided.

The transmission circuit 36 of FIG. 2, which can include the transceiver circuit 38 of FIG. 3 or the transceiver circuit 38 of FIG. 5, can be provided in a user element to enable bandwidth adaptation according to embodiments described above. In this regard, FIG. 6 is a schematic diagram of an exemplary user element 100 wherein the transmission circuit 36 of FIG. 2 can be provided.

Herein, the user element 100 can be any type of user elements, such as mobile terminals, smart watches, tablets, computers, navigation devices, access points, and like wireless communication devices that support wireless communications, such as cellular, wireless local area network (WLAN), Bluetooth, and near field communications. The user element 100 will generally include a control system 102, a baseband processor 104, transmit circuitry 106, receive circuitry 108, antenna switching circuitry 110, multiple antennas 112, and user interface circuitry 114. In a non-limiting example, the control system 102 can be a field-programmable gate array (FPGA), as an example. In this regard, the control system 102 can include at least a microprocessor(s), an embedded memory circuit(s), and a communication bus interface(s). The receive circuitry 108 receives radio frequency signals via the antennas 112 and through the antenna switching circuitry 110 from one or more base stations. A low noise amplifier and a filter cooperate to amplify and remove broadband interference from the received signal for processing. Downconversion and digitization circuitry (not shown) will then downconvert the filtered, received signal to an intermediate or baseband frequency signal, which is then digitized into one or more digital streams using analog-to-digital converter(s) (ADC).

The baseband processor 104 processes the digitized received signal to extract the information or data bits conveyed in the received signal. This processing typically comprises demodulation, decoding, and error correction operations, as will be discussed in greater detail below. The baseband processor 104 is generally implemented in one or more digital signal processors (DSPs) and application specific integrated circuits (ASICs).

For transmission, the baseband processor 104 receives digitized data, which may represent voice, data, or control information, from the control system 102, which it encodes for transmission. The encoded data is output to the transmit circuitry 106, where a digital-to-analog converter(s) (DAC) converts the digitally encoded data into an analog signal and a modulator modulates the analog signal onto a carrier signal that is at a desired transmit frequency or frequencies. A power amplifier will amplify the modulated carrier signal to a level appropriate for transmission, and deliver the modulated carrier signal to the antennas 112 through the antenna switching circuitry 110. The multiple antennas 112 and the replicated transmit and receive circuitries 106, 108 may provide spatial diversity. Modulation and processing details will be understood by those skilled in the art.

Those skilled in the art will recognize improvements and modifications to the preferred embodiments of the present disclosure. All such improvements and modifications are considered within the scope of the concepts disclosed herein and the claims that follow.

What is claimed is:
1. A transmission circuit comprising:
 a power amplifier circuit configured to amplify a radio frequency (RF) signal based on a modulated voltage;
 an envelope tracking integrated circuit (ETIC) configured according to a defined bandwidth limit to generate the modulated voltage based on a modulated target voltage; and
 a transceiver circuit comprising:
  a signal processing circuit configured to modulate the RF signal to a signal modulation bandwidth based on a time-variant modulation vector; and a voltage processing circuit configured to cause the modulated target voltage to be generated in a target voltage bandwidth that is lower than or equal to the defined bandwidth limit of the ETIC when the signal modulation bandwidth is higher than the defined bandwidth limit of the ETIC.

2. The transmission circuit of claim 1, wherein the voltage processing circuit is further configured to cause the modulated target voltage to be generated in the target voltage bandwidth that equals the signal modulation bandwidth when the signal modulation bandwidth is lower than or equal to the defined bandwidth limit of the ETIC.

3. The transmission circuit of claim 1, wherein the voltage processing circuit comprises:
 a frequency equalizer circuit configured to apply a complex filter to the time-variant modulation vector to generate a frequency-equalized modulation vector that can compensate for a voltage distortion filter presented to the power amplifier circuit by coupling the power amplifier circuit to an RF front-end circuit; and
 an amplitude detector configured to detect a time-variant amplitude of the frequency-equalized modulation vector.

4. The transmission circuit of claim 3, wherein the voltage processing circuit further comprises:
 a windowed peak detector circuit configured to:
  generate one or more amplitude samples of the frequency-equalized modulation vector in each of a plurality of sampling windows;
  detect a peak amplitude among the one or more amplitude samples in each of the plurality of sampling windows; and
  generate a sampled modulation vector in the target voltage bandwidth and comprising the peak amplitude detected in each of the plurality of sampling windows; and
 an envelope tracking (ET) lookup table (LUT) circuit configured to generate a modulated digital target voltage based on the sampled modulation vector.

5. The transmission circuit of claim 4, wherein the windowed peak detector circuit is further configured to:
 generate one amplitude sample of the frequency-equalized modulation vector when the signal modulation bandwidth of the RF signal is lower than or equal to the defined bandwidth limit of the ETIC; and
 generate multiple amplitude samples of the frequency-equalized modulation vector when the signal modulation bandwidth of the RF signal is higher than the defined bandwidth limit of the ETIC.

6. The transmission circuit of claim 4, wherein the signal processing circuit comprises:
 a windowing buffer configured to buffer an equal number of amplitude samples of the time-variant modulation vector as a number of the one or more amplitude samples of the frequency-equalized modulation vector that are generated in each of the plurality of sampling windows to thereby generate a windowed modulation vector; and
 a modulator circuit configured to generate the RF signal from the windowed modulation vector.

7. The transmission circuit of claim 4, wherein the transceiver circuit further comprises:
 a current processing circuit configured to generate a compensation term based on the modulated voltage and a total inductive impedance presented at the power amplifier circuit;
 a combiner configured to combine the compensation term and the modulated digital target voltage to generate a modified digital target voltage; and
 a digital-to-analog converter (DAC) configured to convert the modified digital target voltage into the modulated target voltage.

8. The transmission circuit of claim 7, wherein the current processing circuit comprises:
 an equalizer circuit configured to apply a complex current filter to the time-variant modulation vector to generate an equalized modulation vector, wherein the complex current filter is different from the complex filter;
 an amplitude detector circuit configured to detect a time-variant amplitude of the equalized modulation vector;
 a load LUT circuit configured to generate a time-variant digital current term based on the detected time-variant amplitude of the equalized modulation vector; and
 a filter circuit configured to convert the time-variant digital current term into the compensation term.

9. The transmission circuit of claim 3, wherein the voltage processing circuit further comprises:
 an envelope tracking (ET) lookup table (LUT) circuit configured to generate a modulated digital target voltage based on the frequency-equalized modulation vector; and
 a windowed peak detector circuit configured to:
  generate one or more amplitude samples of the modulated digital target voltage in each of a plurality of sampling windows;
  detect a peak amplitude among the one or more amplitude samples in each of the plurality of sampling windows; and
  regenerate the modulated digital target voltage in the target voltage bandwidth based on the peak amplitude detected in each of the plurality of sampling windows.

10. The transmission circuit of claim 9, wherein the windowed peak detector circuit is further configured to:
 generate one amplitude sample of the modulated digital target voltage when the signal modulation bandwidth of the RF signal is lower than or equal to the defined bandwidth limit of the ETIC; and
 generate multiple amplitude samples of the modulated digital target voltage when the signal modulation bandwidth of the RF signal is higher than the defined bandwidth limit of the ETIC.

11. The transmission circuit of claim 9, wherein the transceiver circuit further comprises:
 a current processing circuit configured to generate a compensation term based on the modulated voltage and a total inductive impedance presented at the power amplifier circuit;
 a combiner configured to combine the compensation term and the modulated digital target voltage to generate a modified digital target voltage; and
 a digital-to-analog converter (DAC) configured to convert the modified digital target voltage into the modulated target voltage.

12. The transmission circuit of claim 11, wherein the current processing circuit comprises:
 an equalizer circuit configured to apply a complex current filter to the time-variant modulation vector to generate an equalized modulation vector, wherein the complex current filter is different from the complex filter;
 an amplitude detector circuit configured to detect a time-variant amplitude of the equalized modulation vector;

a load LUT circuit configured to generate a time-variant digital current term based on the detected time-variant amplitude of the equalized modulation vector; and a filter circuit configured to convert the time-variant digital current term into the compensation term.

13. A transceiver circuit comprising:

a signal processing circuit configured to modulate a radio frequency (RF) signal to a signal modulation bandwidth based on a time-variant modulation vector, wherein the RF signal is amplified by a power amplifier circuit based on a modulated voltage generated by an envelope tracking integrated circuit (ETIC) based on a modulated target voltage; and a voltage processing circuit configured to cause the modulated target voltage to be generated in a target voltage bandwidth that is lower than or equal to a defined bandwidth limit of the ETIC when the signal modulation bandwidth is higher than the defined bandwidth limit of the ETIC.

14. The transceiver circuit of claim 13, wherein the voltage processing circuit is further configured to cause the modulated target voltage to be generated in the target voltage bandwidth that equals the signal modulation bandwidth when the signal modulation bandwidth is lower than or equal to the defined bandwidth limit of the ETIC.

15. The transceiver circuit of claim 13, wherein the voltage processing circuit comprises:

a frequency equalizer circuit configured to apply a complex filter to the time-variant modulation vector to generate a frequency-equalized modulation vector; and an amplitude detector configured to detect a time-variant amplitude of the frequency-equalized modulation vector.

16. The transceiver circuit of claim 15, wherein the voltage processing circuit further comprises:

a windowed peak detector circuit configured to:
 generate one or more amplitude samples of the frequency-equalized modulation vector in each of a plurality of sampling windows;
 detect a peak amplitude among the one or more amplitude samples in each of the plurality of sampling windows; and
 generate a sampled modulation vector in the target voltage bandwidth and comprising the peak amplitude detected in each of the plurality of sampling windows; and an envelope tracking (ET) lookup table (LUT) circuit configured to generate a modulated digital target voltage based on the sampled modulation vector.

17. The transceiver circuit of claim 16, wherein the windowed peak detector circuit is further configured to:

generate one amplitude sample of the frequency-equalized modulation vector when the signal modulation bandwidth of the RF signal is lower than or equal to the defined bandwidth limit of the ETIC; and generate multiple amplitude samples of the frequency-equalized modulation vector when the signal modulation bandwidth of the RF signal is higher than the defined bandwidth limit of the ETIC.

18. The transceiver circuit of claim 16, wherein the transceiver circuit further comprises:

a current processing circuit configured to generate a compensation term based on the modulated voltage and a total inductive impedance presented at the power amplifier circuit;

a combiner configured to combine the compensation term and the modulated digital target voltage to generate a modified digital target voltage; and a digital-to-analog converter (DAC) configured to convert the modified digital target voltage into the modulated target voltage.

19. The transceiver circuit of claim 18, wherein the current processing circuit comprises:

an equalizer circuit configured to apply a complex current filter to the time-variant modulation vector to generate an equalized modulation vector, wherein the complex current filter is different from the complex filter;

an amplitude detector circuit configured to detect a time-variant amplitude of the equalized modulation vector;

a load LUT circuit configured to generate a time-variant digital current term based on the detected time-variant amplitude of the equalized modulation vector; and a filter circuit configured to convert the time-variant digital current term into the compensation term.

20. The transceiver circuit of claim 15, wherein the voltage processing circuit further comprises:

an envelope tracking (ET) lookup table (LUT) circuit configured to generate a modulated digital target voltage based on the frequency-equalized modulation vector; and a windowed peak detector circuit configured to:
 generate one or more amplitude samples of the modulated digital target voltage in each of a plurality of sampling windows;
 detect a peak amplitude among the one or more amplitude samples in each of the plurality of sampling windows; and
 regenerate the modulated digital target voltage in the target voltage bandwidth based on the peak amplitude detected in each of the plurality of sampling windows.

* * * * *